United States Patent
Murakami et al.

(10) Patent No.: US 12,539,733 B2
(45) Date of Patent: Feb. 3, 2026

(54) SEAT AIR-CONDITIONING DEVICE

(71) Applicant: DENSO CORPORATION, Kariya (JP)

(72) Inventors: Hironobu Murakami, Kariya (JP); Shuji Ito, Kariya (JP); Takeshi Tanaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 359 days.

(21) Appl. No.: 18/301,777

(22) Filed: Apr. 17, 2023

(65) Prior Publication Data
US 2023/0249513 A1   Aug. 10, 2023

Related U.S. Application Data

(63) Continuation of application No. PCT/JP2021/042608, filed on Nov. 19, 2021.

(30) Foreign Application Priority Data

Dec. 11, 2020 (JP) ................................. 2020-206197

(51) Int. Cl.
*B60H 1/00* (2006.01)
*B60N 2/56* (2006.01)

(52) U.S. Cl.
CPC ..... *B60H 1/00285* (2013.01); *B60H 1/00564* (2013.01); *B60N 2/5642* (2013.01)

(58) Field of Classification Search
CPC ..... B60N 2/565; B60N 2/5642; B60N 2/5635
See application file for complete search history.

(56) References Cited

U.S. PATENT DOCUMENTS

| | | | |
|---|---|---|---|
| 9,415,712 B2 * | 8/2016 | Stoll | B60N 2/5685 |
| 10,123,628 B2 * | 11/2018 | Ishii | B60N 2/5692 |
| 2018/0020838 A1 | 1/2018 | Ishii et al. | |
| 2018/0126881 A1 | 5/2018 | Ui et al. | |
| 2018/0178691 A1 | 6/2018 | Takazaki et al. | |

FOREIGN PATENT DOCUMENTS

| | | |
|---|---|---|
| CN | 108058627 A | 5/2018 |
| JP | 2017019335 A | 1/2017 |
| JP | 2018103656 A | 7/2018 |
| JP | 2019038461 A | 3/2019 |
| JP | 2022011776 A | 1/2022 |
| WO | WO-2016132757 A1 | 8/2016 |

* cited by examiner

*Primary Examiner* — Allen R. B. Schult
(74) *Attorney, Agent, or Firm* — Harness, Dickey & Pierce, P.L.C.

(57) ABSTRACT

A seat air-conditioning device includes a seat pad, a back lid and a blower. The back lid covers an opening side of a ventilation groove of the seat pad. The blower generates an airflow in a ventilation passage which is defined by the ventilation groove and the back lid. The back lid has a communication port that is formed at an opposing region of the back lid, which is opposed to the blower. The communication port is configured to conduct the airflow generated by the blower. The seat pad has a plurality of support portions that contact the back lid and are formed at an overlapping region of the seat pad which overlaps with the opposing region in a thickness direction of the seat pad. The support portions are circumferentially arranged one after another around the communication port.

6 Claims, 17 Drawing Sheets

SEAT AIR-CONDITIONING DEVICE

CROSS REFERENCE TO RELATED APPLICATION

This application is a continuation application of International Patent Application No. PCT/JP2021/042608 filed on Nov. 19, 2021, which designated the U.S. and claims the benefit of priority from Japanese Patent Application No. 2020-206197 filed on Dec. 11, 2020. The entire disclosures of all of the above applications are incorporated herein by reference.

TECHNICAL FIELD

The present disclosure relates to a seat air-conditioning device.

BACKGROUND

Previously, there has been proposed a seat, in which a plate is installed between a seat pad and a blower, so that a ventilation passage formed at the seat pad is not blocked when an occupant is seated on the seat, and the plate member is supported by a plurality of support portions provided to the seat pad.

SUMMARY

This section provides a general summary of the disclosure, and is not a comprehensive disclosure of its full scope or all of its features.

According to one aspect of the present disclosure, there is provided a seat air-conditioning device which is applied to a seat and includes:
  a seat pad that includes:
    a plurality of ventilation holes that are opened at a front surface of the seat pad; and
    a ventilation groove that is formed at a back surface of the seat pad which is opposite to the front surface, wherein the ventilation groove is communicated with the plurality of ventilation holes;
  a back lid that covers an opening side of the ventilation groove; and
  a blower that is configured to generate an airflow in a ventilation passage which is defined by the ventilation groove and the back lid, wherein:
  the back lid has a communication port that is formed at an opposing region of the back lid, which is opposed to the blower, wherein the communication port is configured to conduct the airflow generated by the blower;
  the seat pad has a plurality of support portions that contact the back lid and are located at an overlapping region of the seat pad which overlaps with the opposing region in a thickness direction of the seat pad; and
  the plurality of support portions are circumferentially arranged one after another around the communication port.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
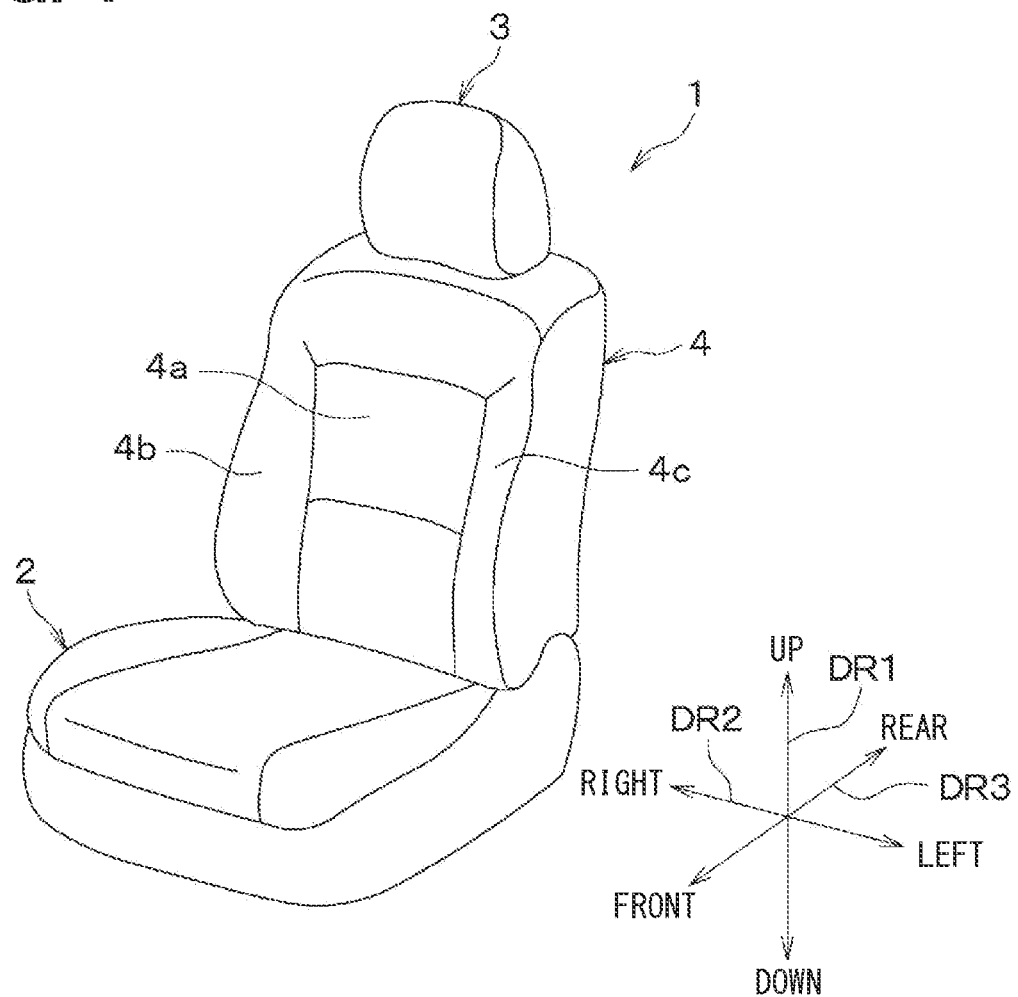
FIG. 1 is a schematic perspective view of a seat to which a seat air-conditioning device of a first embodiment is applied.

Previously, there has been proposed a seat, in which a plate is installed between a seat pad and a blower, so that a ventilation passage formed at the seat pad is not blocked when an occupant is seated on the seat, and the plate member is supported by a plurality of support portions provided to the seat pad.

However, when the plate member, which is a separate member, is added, the number of the constituent components of the seat air-conditioning device at the seat is increased, and the internal structure of the seat inevitably becomes more complicated.

According to one aspect of the present disclosure, there is provided a seat air-conditioning device which is applied to a seat and includes:

a seat pad that includes:
a plurality of ventilation holes that are opened at a front surface of the seat pad which is configured to oppose an occupant seated on the seat; and
a ventilation groove that is formed at a back surface of the seat pad which is opposite to the front surface, wherein the ventilation groove is communicated with the plurality of ventilation holes;
a back lid that has one surface opposed to the back surface of the seat pad, wherein the back lid covers an opening side of the ventilation groove; and
a blower that is opposed to another surface of the back lid, which is opposite to the one surface of the back lid, wherein the blower is configured to generate an airflow in a ventilation passage which is defined by the ventilation groove and the back lid, wherein:
the back lid has a communication port that is formed at an opposing region of the back lid, which is opposed to the blower, wherein the communication port is configured to conduct the airflow generated by the blower;
the seat pad has a plurality of support portions that contact the back lid and are located at an overlapping region of the seat pad which overlaps with the opposing region in a thickness direction of the seat pad; and
the plurality of support portions are circumferentially arranged one after another around the communication port.

With this configuration, the load, which results from, for example, the weight of the occupant seated on the seat, is dispersed to a wide range of the back lid. Therefore, it is possible to limit a reduction in a passage cross-sectional area of the ventilation passage between the seat pad and the back lid caused by the load, which results from, for example, the weight of the occupant seated on the seat without using a separate component. Particularly, the seat pad has the plurality of support portions that are formed at the opposing region which is opposed to the blower. Therefore, it is possible to limit deformation of the portion of the seat pad and the portion of the back lid which are located between the seated occupant and the blower when the occupant is seated on the seat. According to this, a required distance between the bottom of the ventilation groove and the back cover is ensured, and thereby even when the load, which results from, for example, the weight of the seated occupant, is applied to the seat, the airflow rate, which corresponds to the blowing capacity of the blower, can be ensured. Thus, with the simple structure without the need for adding the additional separate component, it is possible to limit the deterioration of the air conditioning performance caused by the load, which results from, for example, the weight of the occupant seated on the seat.

Hereinafter, embodiments of the present disclosure will be described with reference to the drawings. In the following embodiments, the same reference signs may be assigned to portions that are the same as or equivalent to those described in the preceding embodiment(s), and the description thereof may be omitted. Further, when only a portion of any one of the components is described in the embodiment, the description of the component described in the preceding embodiment can be applied to the rest of the component. The following embodiments may be partially combined with each other as long as the combination does not cause any trouble, even if not explicitly stated.

First Embodiment

The present embodiment will be described with reference to FIGS. 1 to 14. In the present embodiment, there will be described an example, in which a seat air-conditioning device 10 of the present disclosure is applied to a seat 1 that is a front seat of a vehicle. Reference signs DR1, DR2, DR3, which indicate corresponding directions at the respective drawings, are provided to facilitate understanding of the relationship among the drawings. The directions DR1, DR2, DR3 indicate an up-to-down direction, a left-to-right direction, and a front-to-rear direction, respectively, in a state where the seat 1 of the embodiment is installed at the vehicle. The installation state of the seat air-conditioning device 10 of the present disclosure is not limited by the directions indicated in the respective drawings.

(Summary of Seat 1)

As shown in FIG. 1, the seat 1 includes: a seat cushion 2 that forms a seat bottom on which an occupant is seated; a headrest 3 that supports a head of the occupant; and a seat back 4 that serves as a backrest for supporting a back of the occupant. The occupant is a user of the seat 1 and includes a user who is currently seated on the seat 1 and a user who is not currently seated on the seat 1.

The seat cushion 2 supports buttocks of a lower body of the occupant. The seat cushion 2 includes a cushion pad, a surface cover and the like (not shown). The cushion pad is a cushioning member made of an elastically deformable material, such as urethane foam. The surface cover is a member that covers a front side of the cushion pad.

The headrest 3 is a member that supports a head of the occupant. The headrest 3 includes a head pad, a surface cover and the like (not shown). The head pad is a cushioning member made of an elastically deformable material, such as urethane foam. The surface cover is a member that covers a front side of the head pad.

Figure 2:
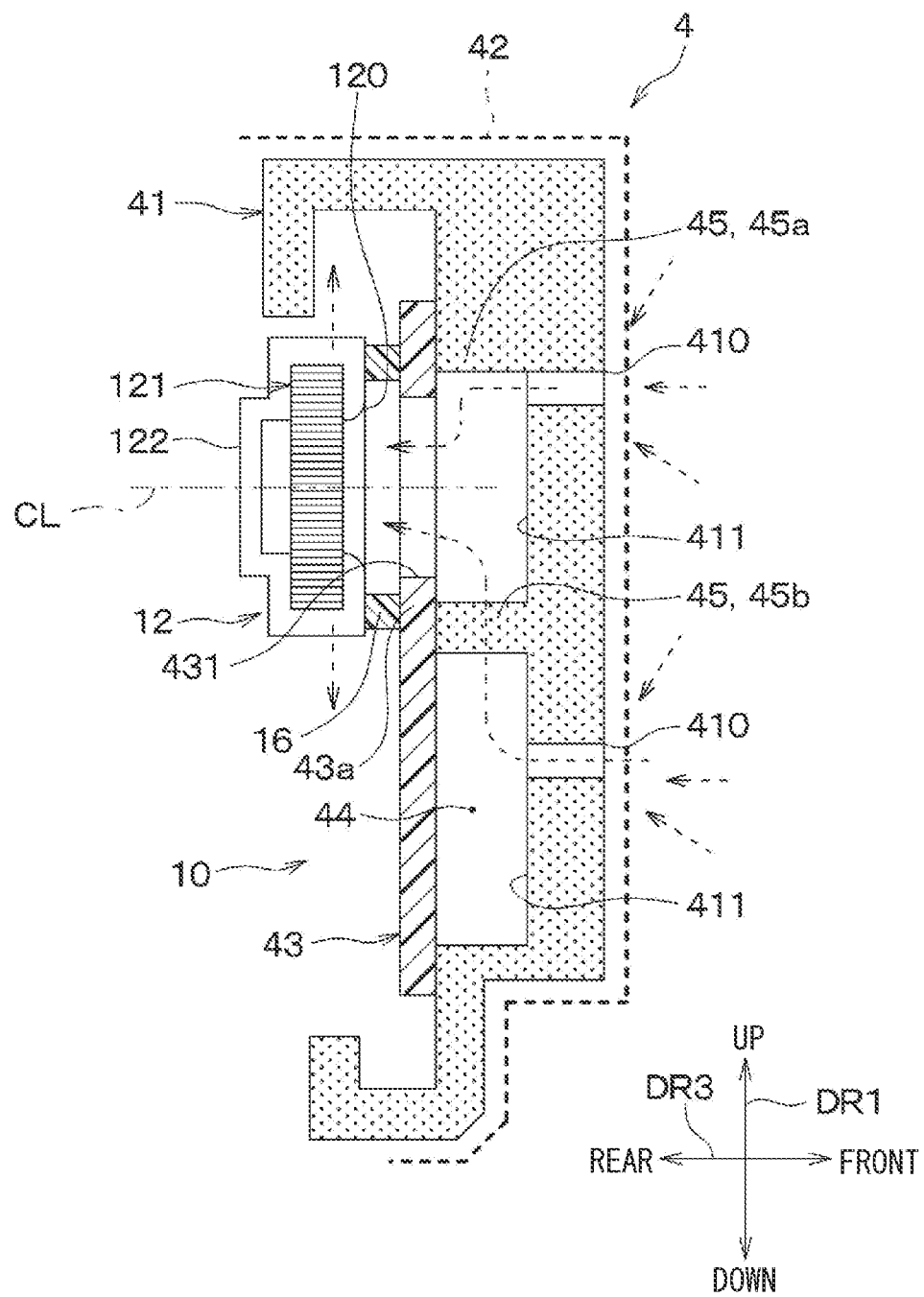
FIG. 2 is a schematic longitudinal cross-sectional view of a seat back.

The seat back 4 is a member that supports an upper body of the occupant other than the head of the occupant. A lower end portion of the seat back 4 is coupled to a rear end portion of the seat cushion 2 through a reclining mechanism (not shown). Furthermore, the headrest 3 is coupled to an upper end portion of the seat back 4. The seat back 4 includes: a center support 4a, which serves as the backrest for supporting the back of the occupant; and two side supports 4b, 4c, which are respectively placed at two opposite sides of the center support 4a. Furthermore, as shown in FIG. 2, the seat back 4 includes a back pad 41, a surface cover 42, a back lid 43 and a back frame (not shown).

The back pad 41 is a cushioning member made of an elastically deformable material, such as urethane foam. The back pad 41 includes a plurality of ventilation holes 410 that are opened at a front surface of the back pad 41 configured to oppose to the occupant seated on the seat 1. Each of the ventilation holes 410 is a through-hole that extends through the back pad 41. The back pad 41 also includes a ventilation groove 411 that is formed at a back surface of the back pad 41 opposite to the front surface and is communicated with the ventilation holes 410. The back pad 41 serves as a seat pad of the present disclosure. The front surface of the back pad 41 is placed on the front side in the front-to-rear direction DR3, and the back surface of the back pad 41 is placed on the rear side in the front-to-rear direction DR3. Details of the back pad 41 will be described later.

The surface cover 42 is a member that covers the front surface of the back pad 41. The surface cover 42 is placed at the front side of the seat back 4 which forms a support surface for supporting the upper body of the occupant. The surface cover 42 is made of a breathable material or a material with ventilation holes. Specifically, the surface cover 42 is made of a cloth, a fabric, a skin or the like.

The back lid 43 is a closing member and has one surface opposed to the back surface of the back pad 41 and covers an opening side (more specifically, a whole extent of the opening side) of the ventilation groove 411. The back lid 43 is formed by, for example, resin such as hard felt or polypropylene.

The back frame is a frame-shaped member that forms a skeleton of the seat back 4. The back pad 41 is installed to the back frame. An installation space, in which a blower 12 described later is installed, is formed between the back frame and the back pad 41. A lumber support may be added to the back frame. The lumber support is a member that holds a waist of the body of the occupant to ensure proper posture of the occupant.

(Summary of Seat Air-Conditioning Device 10)

Figure 3:
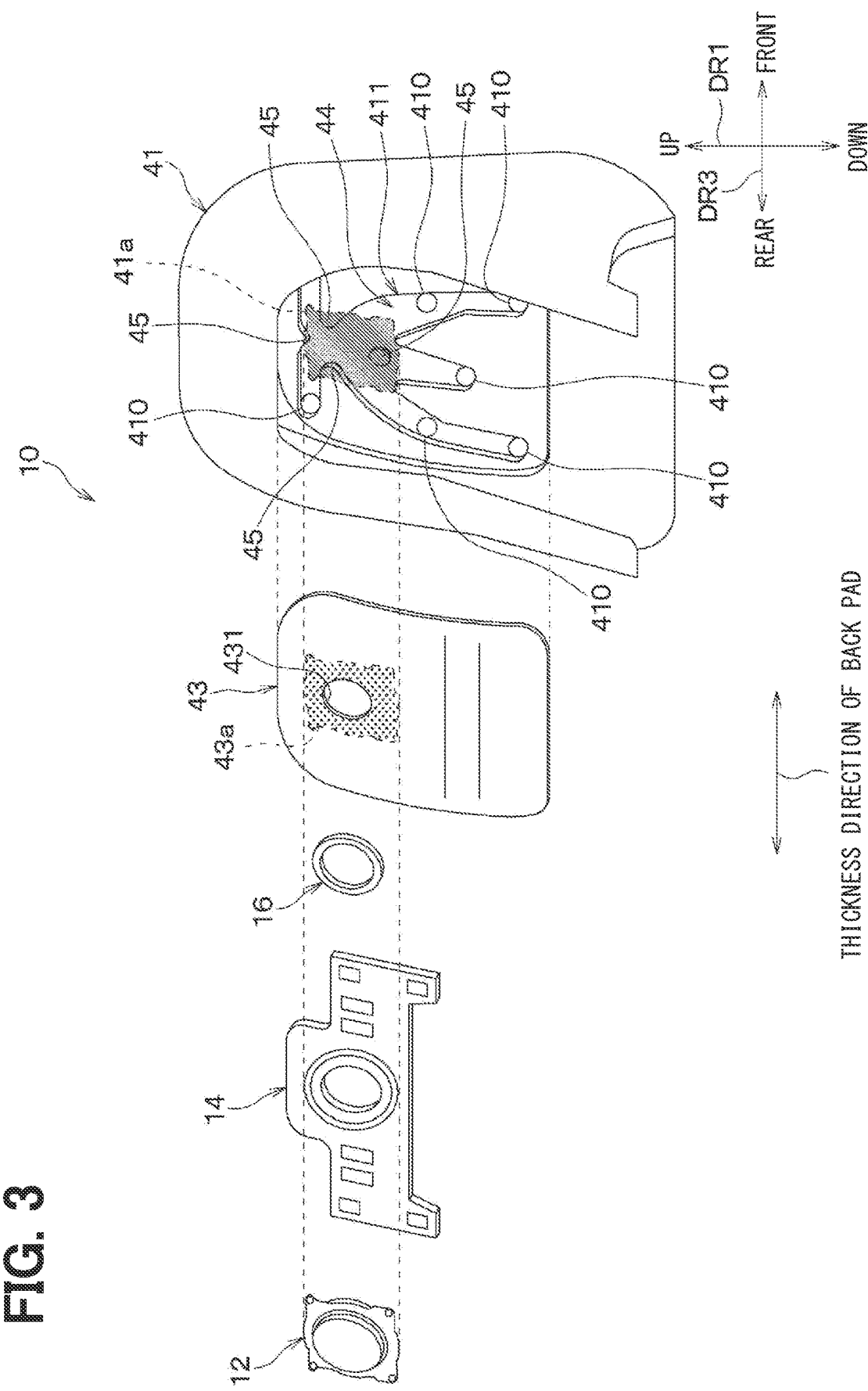
FIG. 3 is a schematic exploded view of the seat air-conditioning device.

The seat air-conditioning device 10 is an SVS (Seat Ventilation System) that directly cools the body of the occupant by blowing the air from the seat 1. As shown in FIG. 3, the seat air-conditioning device 10 includes the blower 12, a mounting plate 14, a seal member 16, the back pad 41 and the back lid 43.

Figure 4:
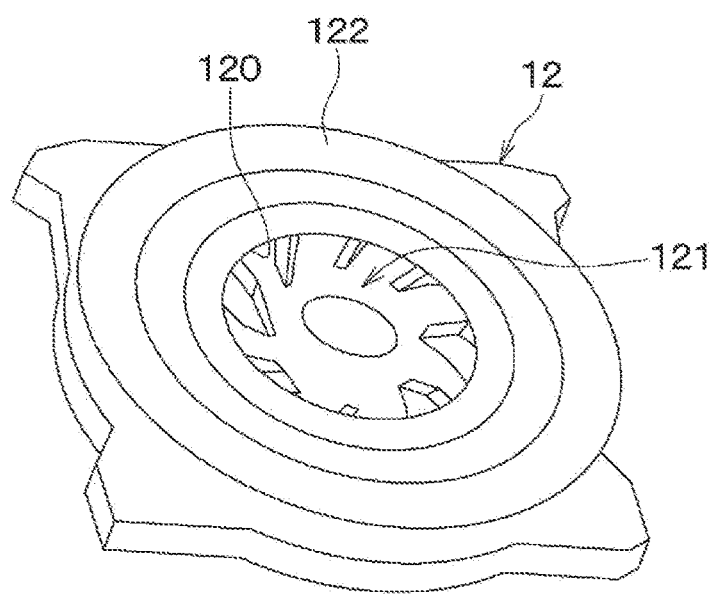
FIG. 4 is a schematic perspective view of a blower.

The blower 12 generates an airflow in a ventilation passage 44 that is formed at an inside of the seat back 4. As shown in FIGS. 2 and 4, the blower 12 is a 360-degree blowing centrifugal blower. This type of centrifugal blower is configured to radially outwardly blow the air, which is suctioned from a suction port 120 of the blower 12 located at one side in an axial direction of a rotational axis CL of the blower 12, from an entire outer periphery (i.e., a 360 degree range) of the blower 12 around the rotational axis CL. A radial direction of the rotational axis CL is a direction that is perpendicular to the axial direction of the rotational axis CL.

The blower 12 includes: an impeller 121 which is rotated about the rotational axis CL; and a casing 122 which receives the impeller 121. The impeller 121 is a turbofan, in which blades are directed backward with respect to a rotational direction. The casing 122 has the suction port 120 located at the one side in the axial direction of the rotational axis CL, and a substantially entire outer periphery of the casing 122, which is located at an outer side in the radial direction of the rotational axis CL, is opened. The suction port 120 is shaped generally in a form of a circle. The blower 12 is mounted to the back frame through the mounting plate 14. The mounting plate 14 has an opening that is opposed to the suction port 120. The blower 12 is opposed to the other surface of the back lid 43, which is opposite to the one surface of the back lid 43.

Figure 5:
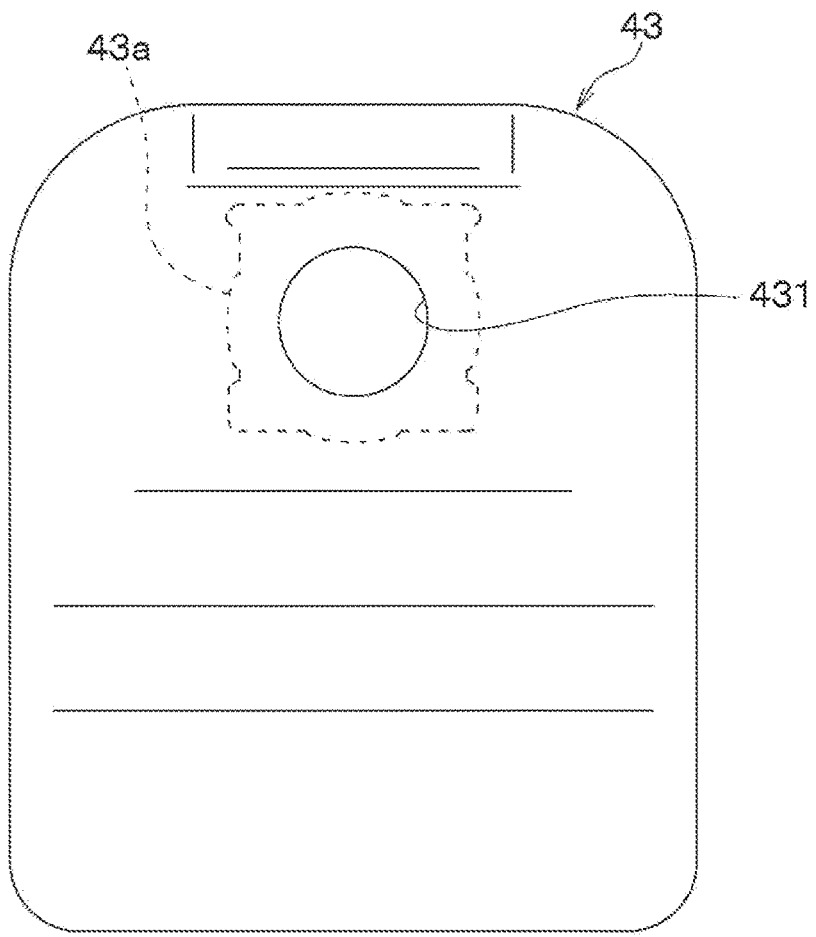
FIG. 5 is a schematic plan view of a back lid.

As shown in FIGS. 2, 3 and 5, the back lid 43 has a communication port 431 that is formed at an opposing region 43a of the back lid 43, which is opposed to the blower 12. The communication port 431 is configured to conduct the airflow generated by the blower 12. The communication port 431 is formed at an opposing region of the back lid 43 which is opposed to the suction port 120 of the blower 12. Like the suction port 120, the communication port 431 is shaped generally in a form of a circle. In FIG. 3, to make it easier to grasp the opening position of the communication port 431, a plurality of dots are added to the opposing region 43a of the back lid 43 which is opposed to the blower 12.

Furthermore, in FIG. 3, a plurality of dots are also added to an overlapping region 41a of the back pad 41 which overlaps with the opposing region 43a in a thickness direction of the back pad 41. The blower 12, the opposing region 43a and the overlapping region 41a overlap with each other in the thickness direction of the back pad 41. Each of the opposing region 43a and the overlapping region 41a is a projected surface region that is formed by projecting the blower 12 onto the corresponding one of the back lid 43 and the back pad 41.

Figure 6:
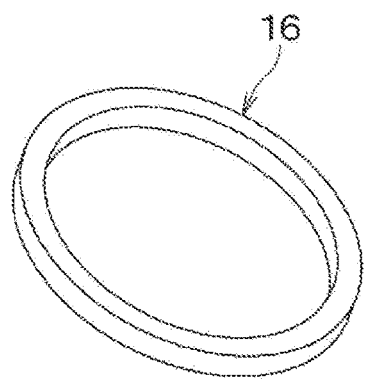
FIG. 6 is a schematic perspective view of a seal member.

The seal member 16, which is shaped in a ring form, is placed between the back lid 43 and the blower 12 to seal between the back lid 43 and the blower 12. The seal member 16 is placed between the blower 12 and the back lid 43 and circumferentially surrounds the communication port 431. As shown in FIG. 6, the seal member 16 is a circular ring member that has a sealing property. The seal member 16 has a size that enables the seal member 16 to surround the communication port 431. The seal member 16 is clamped between the casing 122 of the blower 12 and the back lid 43. The seal member 16 may be formed together with one of the back lid 43 and the mounting plate 14 as a subassembly.

Figure 7:
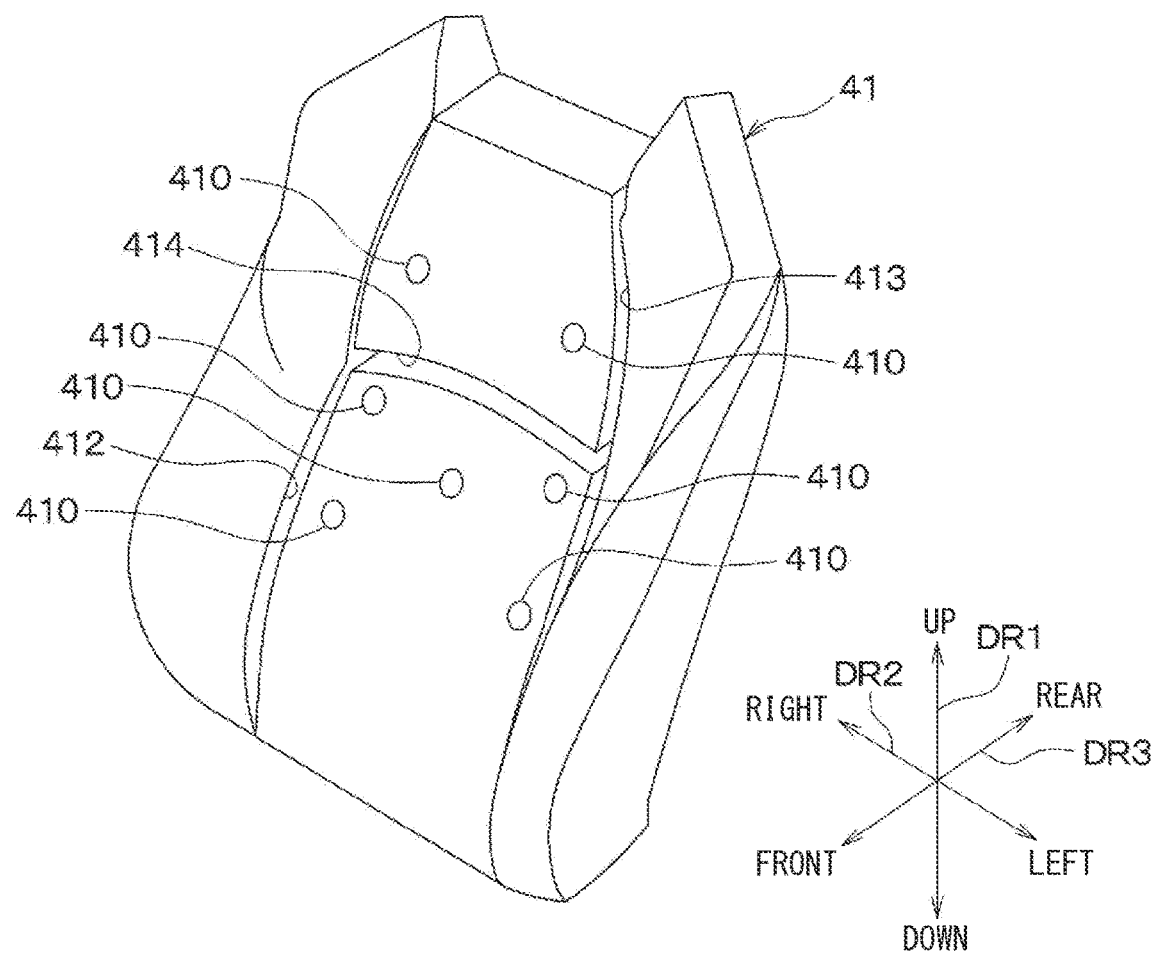
FIG. 7 is a schematic perspective view of a back pad used at the seat back.

As shown in FIG. 7, a pair of vertical hanging grooves 412, 413, which extend in the up-to-down direction DR1, and a transverse hanging groove 414, which extends in the left-to-right direction DR2, are formed at the front surface of the back pad 41. Each of the pair of vertical hanging grooves 412, 413 and the transverse hanging groove 414 serves as a connecting portion, at which a corresponding wire (not shown) embedded in the back pad 41 is coupled to a corresponding string (not shown) provided to the surface cover 42 to couple the surface cover 42 to the back pad 41. The number of the ventilation holes 410, which are opened at the front surface of the back pad 41, is seven. Specifically, three ventilation holes 410 are arranged along each of the pair of vertical hanging grooves 412, 413, and one ventilation hole 410 is arranged at or around a center of the transverse hanging groove 414.

Figure 8:
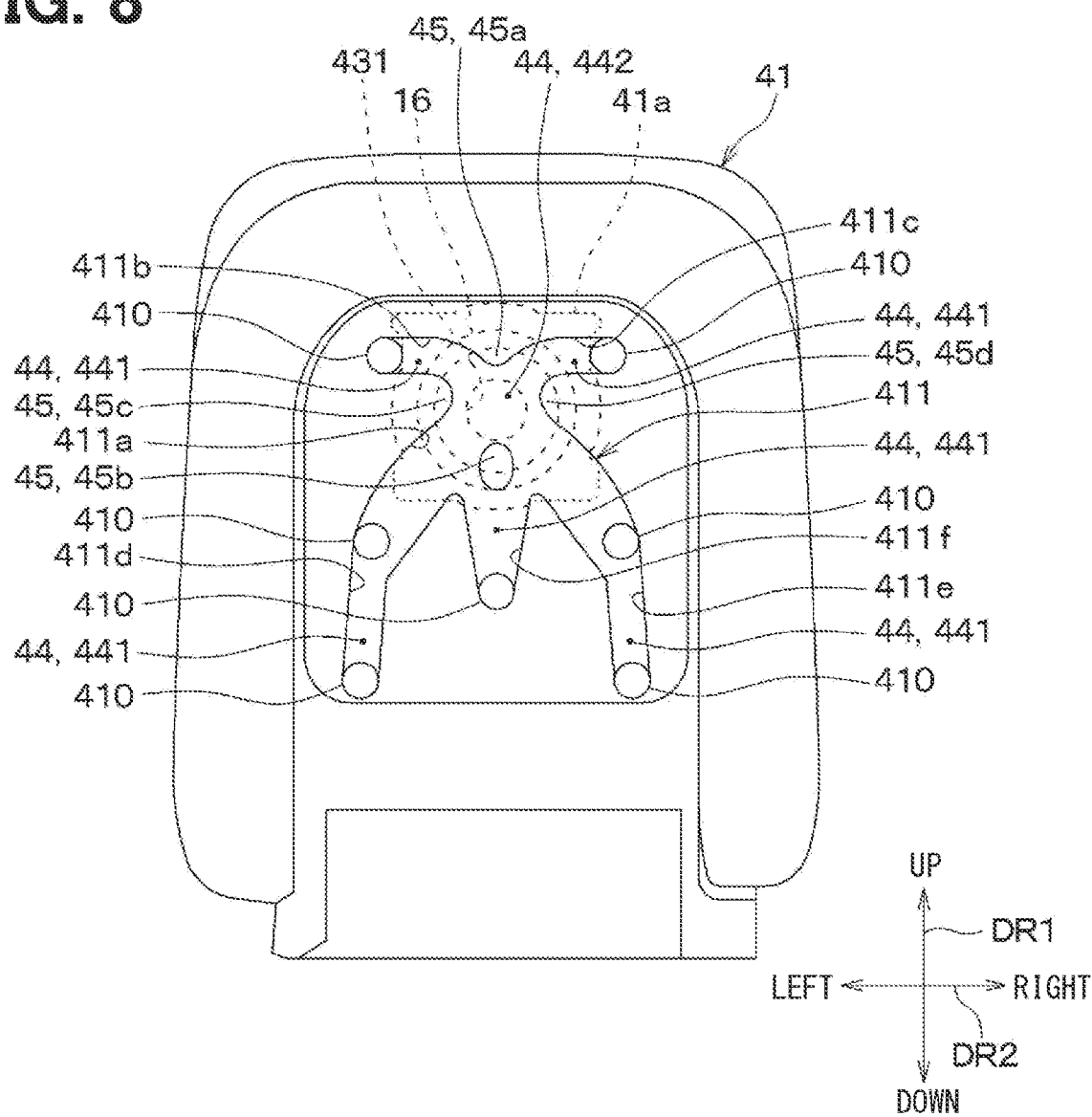
FIG. 8 is a schematic rear view of the back pad used at the seat back.

As shown in FIG. 8, the ventilation groove 411, which is communicated with the ventilation holes 410, is formed at the back surface of the back pad 41. The ventilation groove 411 includes a center groove 411a and five grooves 411b, 411c, 411d, 411e, 411f while each of the grooves 411b, 411c, 411d, 411e, 411f extends from the center groove 411a toward a corresponding one or more of the ventilation holes 410.

The seat back 4 includes the ventilation passage 44 which conducts the airflow generated by the blower 12. The ventilation passage 44 is defined by the ventilation groove 411 of the back pad 41 and the back lid 43. Specifically, when the opening of the ventilation groove 411 of the back pad 41 is closed by the back lid 43, the ventilation passage 44 is formed.

The ventilation passage 44 includes: a plurality of tubular portions 441 each of which extends toward the corresponding one or more of the ventilation holes 410; and a manifold portion 442 which collects the airflows respectively conducted through the tubular portions 441. The manifold portion 442 is formed at a location which corresponds to the opposing region 43a and the overlapping region 41a. Therefore, the airflows, which are conducted through the ventilation holes 410 and the tubular portions 441, are guided to the blower 12 described later through the manifold portion 442 and the communication port 431.

Figure 9:
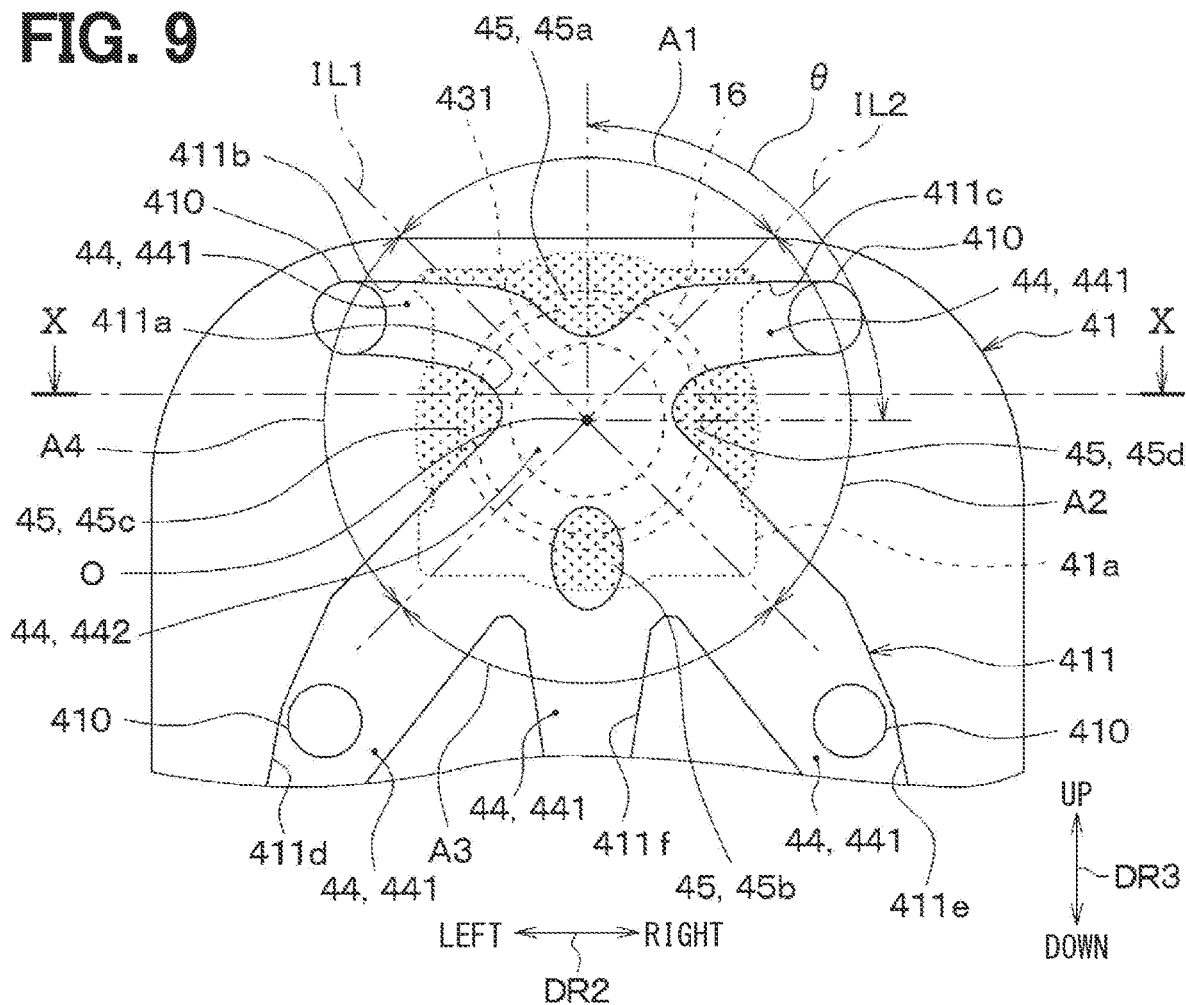
FIG. 9 is a schematic rear view of the back pad used at the seat back of the first embodiment.
Figure 10:
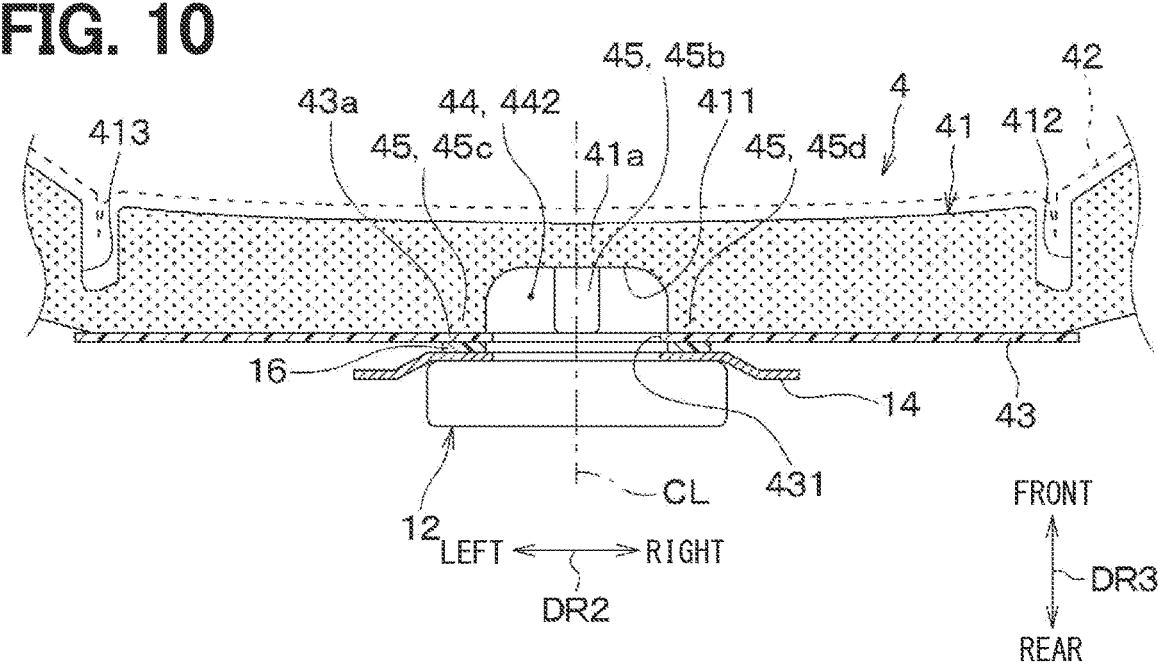
FIG. 10 is a cross-sectional view taken along line X-X in FIG. 9.

As shown in FIGS. 2, 9 and 10, the back pad 41 has a plurality of support portions 45 that contact the back lid 43 and are located at the overlapping region 41a of the back pad 41. The support portions 45 are circumferentially arranged one after another around the communication port 431. The support portions 45 are placed at a location, which does not overlap with the communication port 431 in the thickness direction of the back pad 41, so that the support portions 45 do not close the communication port 431. The support portions 45 are integrally molded with the back pad 41 in one-piece. The support portions 45 project from a bottom surface of the ventilation groove 411 toward the opposing region 43a of the back lid 43. The support portions 45 may be connected together through an outer region of the back pad 41, which is located at the outside of the overlapping region 41a, or the support portions 45 may not be connected together. The support portions 45 should be configured to contact the back lid 43 when a load is applied at least to the front surface of the seat back 4. In a state where the load is not applied to the front surface of the seat back 4, the support portions 45 may contact the back lid 43 or may not contact the back lid 43. The support portions 45 may contact the opposing region 43a of the back lid 43 or may contact an outer region of the back lid 43 which is located on an outer side of the opposing region 43a.

Here, in FIG. 9, to make it easier to grasp locations of the support portions 45, a plurality of dots are added to the locations of the back pad 41 which correspond to the support portions 45. As shown in FIG. 9, the back pad 41 of the present embodiment has four support portions 45a, 45b, 45c, 45d as the support portions 45 at the overlapping region 41a. When the overlapping region 41a is equally divided by the number (four in this example) of the support portions 45 into four areas A1-A4 in the circumferential direction about a center O of the communication port 431, the four support portions 45a, 45b, 45c, 45d are respectively located at the four areas A1-A4. In other words, when the overlapping region 41a is divided into the four areas A1-A4 by two imaginary lines IL1, IL2 which respectively extend through the center O of the communication port 431 and are perpendicular to each other, the support portions 45a, 45b, 45c, 45d are respectively located at these four areas A1-A4. The support portions 45a, 45b, 45c, 45d are arranged at a substantially equal angle interval θ (in this example, about 90°) in the circumferential direction around the center O of the communication port 431. Therefore, the vicinity portions, which are in the vicinity of the communication port 431 at the ventilation passage 44, extend radially outwardly and are arranged at the substantially equal angle interval θ in the circumferential direction around the center O of the communication port 431.

Specifically, the support portions 45a, 45b, 45c, 45d are placed at an overlapping part of the overlapping region 41a which overlaps with the seal member 16 in the thickness direction of the back pad 41. Specifically, a part of each of the support portions 45a, 45b, 45c, 45d overlaps with the seal member 16 in the thickness direction of the back pad 41. The support portions 45a, 45b, 45c, 45d are opposed to the seal member 16 while the back lid 43 is interposed between the support portions 45a, 45b, 45c, 45d and the seal member 16.

A size of each of the support portions 45a, 45b, 45c, 45d is progressively decreased toward the communication port 431, and thereby a distance between each circumferentially adjacent two of the support portions 45a, 45b, 45c, 45d is progressively increased toward the communication port 431. Specifically, a width of each of the support portions 45a, 45b, 45c, 45d is progressively decreased toward the communication port 431, and thereby a passage cross-sectional area of an interposed part of the ventilation passage 44, which is interposed between the circumferentially adjacent two of the support portions 45a, 45b, 45c, 45d, is progressively increased toward the communication port 431.

The support portions 45a, 45b, 45c, 45d of the present embodiment are respectively placed at four locations, i.e., an upper location, a lower location, a left location and a right location at the center groove 411a. The support portions 45a, 45b, which are respectively placed at the upper location and the lower location, are arranged such that distal end parts of the support portions 45a, 45b are opposed to each other while the center O of the communication port 431 is interposed therebetween. The support portions 45c, 45d, which are respectively placed at the left location and the right location, are arranged such that distal end parts of the support portions 45c, 45d are opposed to each other while the center O of the communication port 431 is interposed therebetween. Furthermore, a part (specifically, the distal end part) of each of the support portions 45a, 45b, 45c, 45d, which is adjacent to the communication port 431, is shaped in a round form that does not have a corner. Specifically, the part of each of the support portions 45a, 45b, 45c, 45d, which is adjacent to the communication port 431, is curved in a substantially arcuate form.

A contact area of each of the support portions 45a, 45b, 45c, 45d, which contacts the back lid 43, is substantially equally sized. It is desirable that the contact area of each of the support portions 45a, 45b, 45c, 45d, which contacts the back lid 43, is set such that a section of the contact area, to which a relatively large load is applied at the time when the occupant seats on the seat 1, is larger than another section of the contact area, to which a relatively small load is applied at the time when the occupant seats on the seat 1.

(Operation of Seat Air-Conditioning Device 10)

In the seat air-conditioning device 10, which is formed in the above-described manner, when the blower 12 is driven, the air is suctioned into the suction port 120 of the blower 12, as shown in FIG. 2. At this time, the air, which is present at the front side of the seat back 4, is collected around the communication port 431 through the ventilation holes 410 and the ventilation passage 44 and is thereafter suctioned into the blower 12. The air, which is suctioned into the blower 12, is blown radially outward from the entire outer periphery of the blower 12.

When the air is suctioned from the front side of the seat back 4 in this way, the heat of the seat back 4, which is hot at the beginning of the occupant's ride on the vehicle, is not blown to the body of the occupant, thus improving the cooling effect for cooling the body of the occupant. In addition, the cold air, which is blown from an instrument panel at the front of the vehicle, is suctioned along the body of the seated occupant, so that the cooling effect of the body can be further improved.

Figure 11:
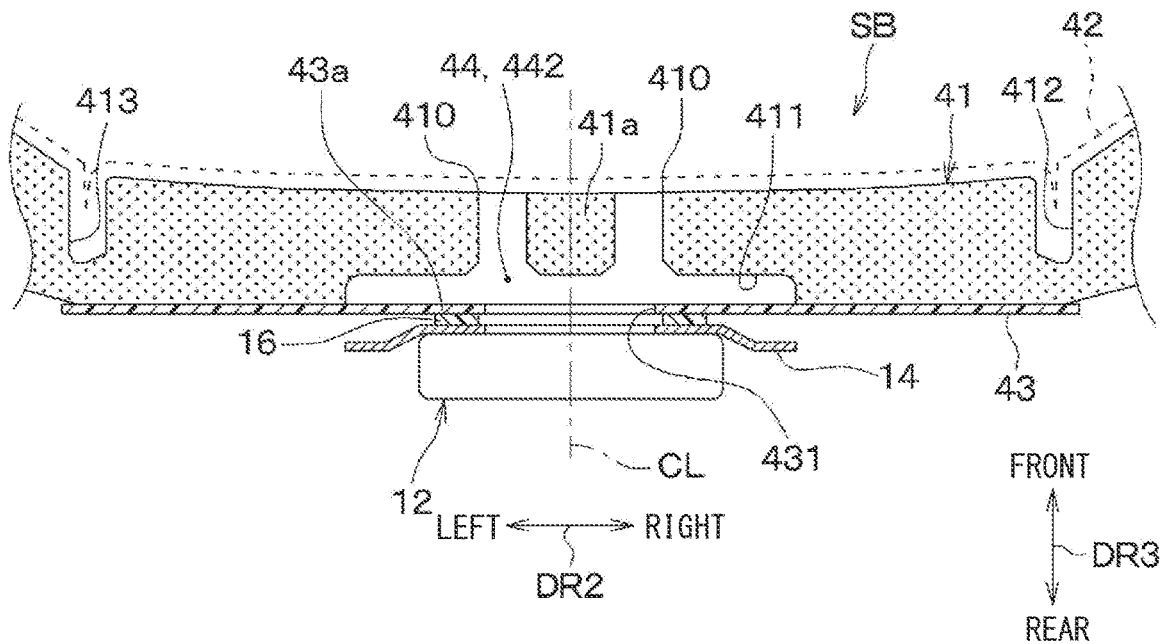
FIG. 11 is a schematic transverse cross-sectional view of a seat back of a comparative example.
Figure 12:
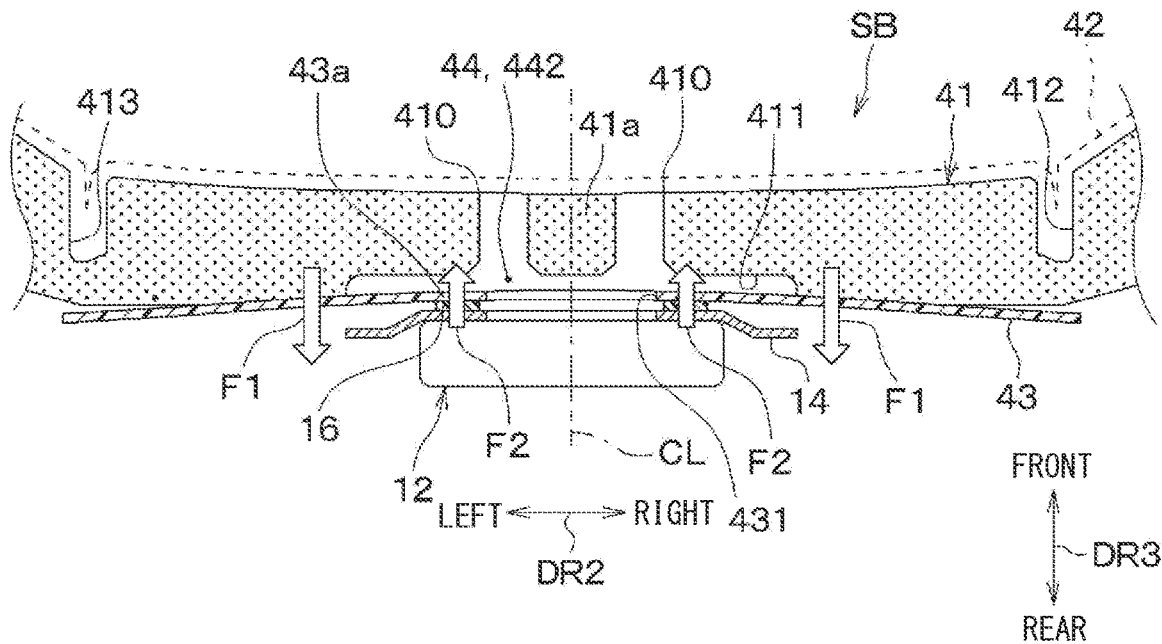
FIG. 12 is an explanatory diagram for explaining a state when a load is applied to a surface of the seat back of the comparative example.

Here, FIGS. 11 and 12 are schematic transverse cross-sectional views of a seat back SB of a comparative example of the present embodiment. The seat back SB of the comparative example differs from the seat back 4 of the present embodiment with respect to that the support portions 45 at the overlapping region 41a of the back pad 41 are absent. In FIGS. 11 and 12, the same reference signs are assigned to the same or equal parts of the seat back SB of the comparative example as those of the seat back 4 of the present embodiment.

As shown in FIG. 11, at the seat back SB, the support portions 45 are not provided at the overlapping region 41a of the back pad 41, and the entire overlapping region 41a constitutes the ventilation passage 44. In the seat back SB having the structure described above, when a load F1, which results from, for example, the weight of the seated occupant, is applied from the front surface side of the seat back SB, a part or the whole of the overlapping region 41a of the seat back SB is deformed to approach the back lid 43. Therefore, a distance between the back lid 43 and the bottom surface of the ventilation groove 411 is reduced to cause a reduction in a passage cross-sectional area of the ventilation passage 44. Furthermore, as shown in FIG. 12, when the load F1, which results from, for example, the weight of the seated occupant, is applied from the front surface side, the load F1 is applied to another portion of the back lid 43, which is other than the opposing region 43a. At this time, a reaction force F2 of the seal member 16 against the load, which results from, for example, the weight of the seated occupant applied from the front surface side, is exerted at the opposing region 43a of the back lid 43, so that the back lid 43 is deformed. Specifically, the back lid 43 is deformed such that the distance between the back lid 43 and the bottom surface of the ventilation groove 411 is reduced, and thereby the passage cross-sectional area of the ventilation passage 44 is reduced. As described above, when the passage cross-sectional area of the ventilation passage 44 is reduced, the flow rate of the air, which flows in the ventilation passage 44, is largely reduced, and thereby the air conditioning function is significantly deteriorated.

In order to avoid this, it is conceivable to construct such that a plate member is placed between the back pad 41 and the blower 12 to support the back pad 41 with the plate member. However, in such a case, the number of the components is increased, and the internal structure of the seat 1 becomes more complicated.

Figure 13:
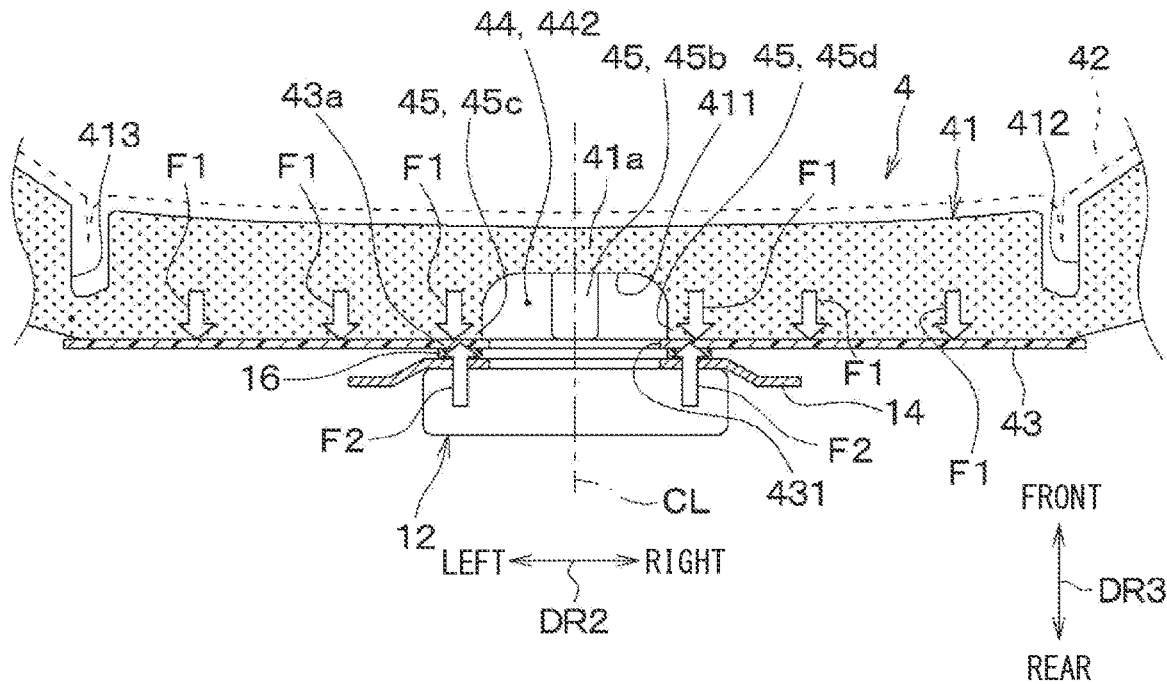
FIG. 13 is an explanatory diagram for explaining a state when a load is applied to a surface of the seat back of the first embodiment.

In view of the above point, in the seat air-conditioning device 10 of the present embodiment, the support portions 45, which contact the back lid 43, are provided at the overlapping region 41a of the back pad 41 which overlaps with the opposing region 43a in the thickness direction of the back pad 41. Therefore, the load F1, which results from, for example, the weight of the seated occupant applied from the front surface side, is spread over the wide range of the back lid 43, as shown in FIG. 13. Therefore, it is possible to limit a reduction in a passage cross-sectional area of the ventilation passage 44 between the back pad 41 and the back lid 43 caused by the load resulting from, for example, the seating of the occupant without using an additional component. Particularly, the plurality of support portions 45 are provided to the back pad 41 such that the support portions 45 are circumferentially arranged one after another around the communication port 431 which is opposed to the blower 12. Therefore, when the occupant is seated on the seat 1, it is possible to limit the deformation of portions of the back pad 41 and the back lid 43, which are located between the seated occupant and the blower 12. According to this, the required distance between the bottom of the ventilation groove 411 and the back lid 43 is ensured, and thereby even when the load, which results from, for example, the weight of the seated occupant, is applied to the seat 1, the airflow rate, which corresponds to the blowing capacity of the blower 12, can be ensured. Thus, with the simple structure without the need for adding the additional component, it is possible to limit the deterioration of the air conditioning performance caused by the load, which results from, for example, the weight of the occupant seated on the seat 1.

Furthermore, according to the present embodiment, the following advantages can be achieved.

(1) At least three support portions 45 are provided to the back pad 41. The overlapping region 41a is equally divided by the number of the support portions 45 into the corresponding number of the areas in the circumferential direction about the center O of the communication port 431, and the support portions 45 are respectively located at these areas. Therefore, since the support portions 45 are substantially uniformly distributed around the communication port 431, the airflow velocity distribution can be uniformly set at or around the communication port 431. When the airflow velocity distribution at or around the communication port 431 becomes uniform, the airflow resistance is limited to a low level. Therefore, the noise at the blower 12 can be limited.

Figure 14:
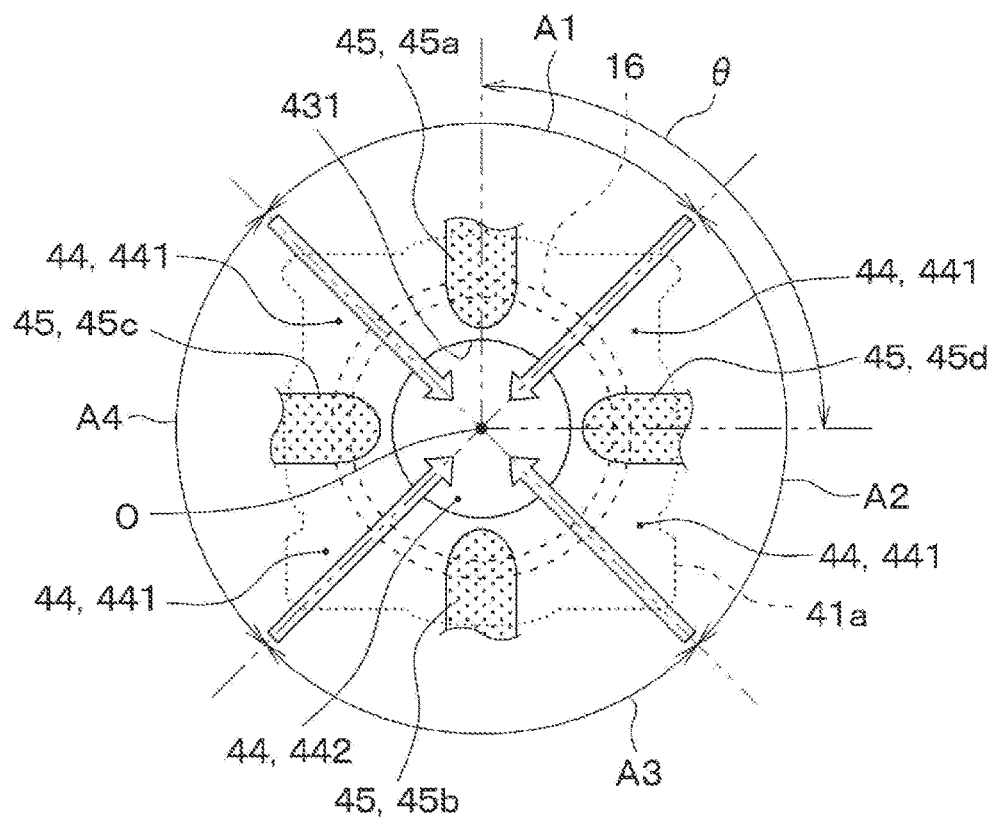
FIG. 14 is an explanatory diagram for explaining an airflow around a communication port of the back pad of the first embodiment.

As shown in FIG. 14, in the present embodiment, the back pad 41 has the four support portions 45 that are respectively located at the four areas A1-A4 which are obtained by equally dividing the overlapping region 41a by four in the circumferential direction about the center O of the communication port 431. Therefore, the vicinity portions, which are in the vicinity of the communication port 431 at the ventilation passage 44, extend radially outwardly and are arranged at the substantially equal angle interval θ in the circumferential direction around the center O of the communication port 431. Therefore, when the airflow is supplied form the ventilation passage 44 to the communication port 431, it is possible to limit a variation in the flow rate of the airflow in the circumferential direction of the communication port 431. Thus, the airflow velocity distribution in the vicinity of the communication port 431 is made uniform.

(2) The blower 12 is the 360-degree blowing centrifugal blower and is configured to radially outwardly blow the air, which is suctioned from the suction port 120 of the blower 12 located at the one side in the axial direction of the rotational axis CL, from the entire outer periphery of the blower 12 around the rotational axis CL. In the back lid 43, the communication port 431 is placed at the location where the communication port 431 is opposed to the suction port 120.

In the 360-degree blowing centrifugal blower, when the airflow, which is suctioned into the suction port 120, is locally increased in the circumferential direction of the suction port 120, the airflow velocity distribution around the suction port 120 becomes non-uniform. Therefore, the noise, which is generated at the time of colliding the airflow against the blades of the impeller 121, is increased, and also the efficiency of the blower 12 is decreased. When the structure, in which the support portions 45 are uniformly arranged around the communication port 431, is applied to this type of centrifugal blower, it is possible to limit the local increase of the airflow in the circumferential direction of the suction port 120 at the time of suctioning the airflow into the suction port 120. Therefore, the airflow velocity distribution around the suction port 120 becomes uniform. As a result, the noise can be limited, and the efficiency of the blower 12 can be improved. Therefore, the structure, in which the support portions 45 are uniformly arranged around the communication port 431, is suitable for the seat air-conditioning device 10 that includes the 360-degree blowing centrifugal blower.

(3) The size of each of the support portions 45 is progressively decreased toward the communication port 431, and thereby the distance between each circumferentially adjacent two of the support portions 45 is progressively increased toward the communication port 431. With this configuration, the passage cross-sectional area of the interposed part of the ventilation passage 44, which is interposed between the circumferentially adjacent two of the support portions 45, is progressively increased toward the communication port 431. Therefore, the sufficient ventilation passage cross-sectional area can be ensured around the communication port 431, and thereby it is possible to limit an increase in the airflow resistance resulting from the provision of the support portions 45 around the communication port 431. That is, it is possible to limit an influence on the air conditioning performance caused by the provision of the support portions 45 around the communication port 431.

(4) The part of each of the support portions 45, which is adjacent to the communication port 431, is shaped in the round form that does not have the corner. With this configuration, a disturbance in the airflow at the time of conducting the airflow along the part of the support portion 45 is less likely to occur. Therefore, the airflow at the communication port 431 is stabilized, and the airflow velocity distribution around the communication port 431 can be made uniform.

(5) The seat air-conditioning device 10 includes the seal member 16 that is placed between the blower 12 and the back lid 43 and circumferentially surrounds the communication port 431. The support portions 45 are placed at the overlapping part of the overlapping region 41a which overlaps with the seal member 16 in the thickness direction of the back pad 41. With this configuration, as shown in FIG. 13, the reaction force F2 of the seal member 16, which is generated in response to, for example, the load F1 resulting from the seating of the occupant, can be supported by the support portions 45, so that deformation of the back lid 43, which is caused by the reaction force F2 of the seal member 16, can be limited. Therefore, it is possible to limit a reduction in the passage cross-sectional area of the ventilation passage 44 between the back pad 41 and the back lid 43 caused by the load resulting from, for example, the seating of the occupant while ensuring the sufficient degree of sealing between the blower 12 and the back lid 43.

Second Embodiment

Next, a second embodiment will be described with reference to FIGS. 15 and 16. In the present embodiment, points, which are different from the first embodiment, will be mainly described.

Figure 15:
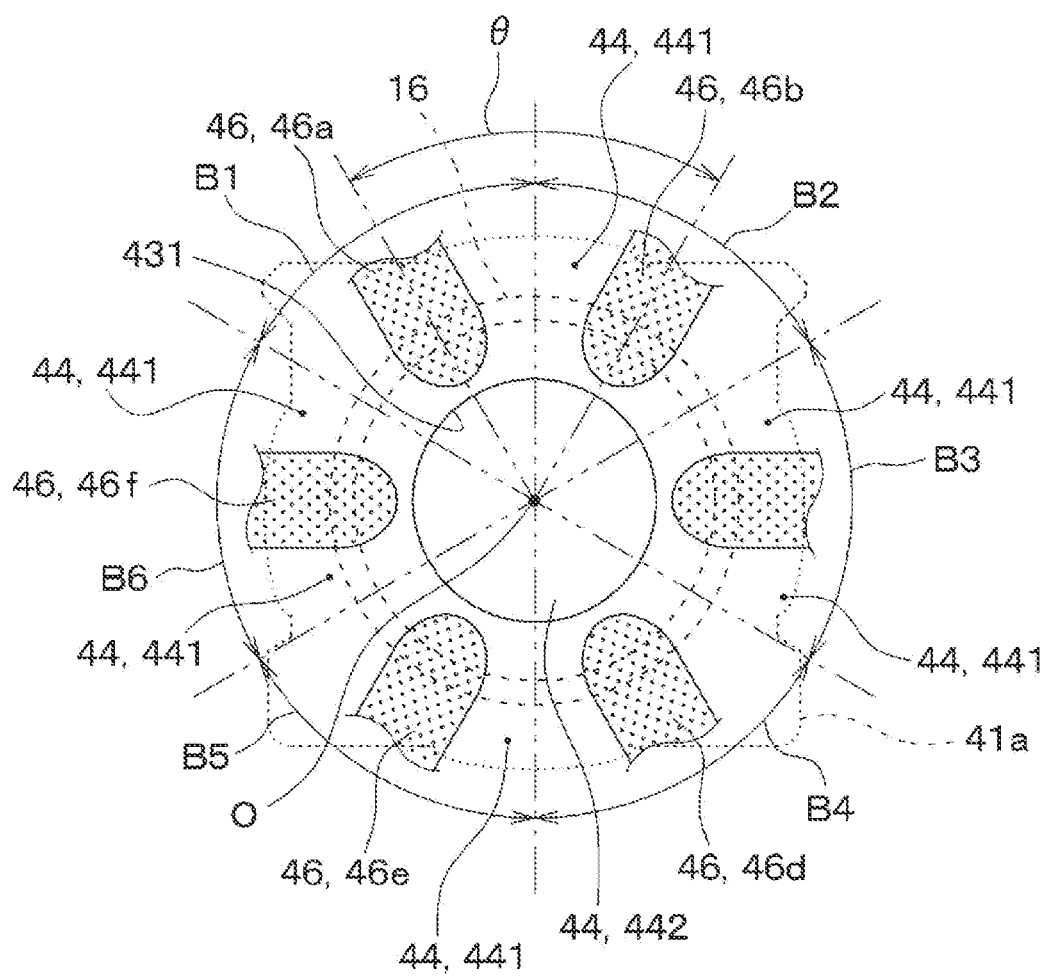
FIG. 15 is an explanatory diagram for explaining an arrangement pattern of support portions around the communication port of the back pad according to a second embodiment.

As shown in FIG. 15, the back pad 41 of the present embodiment has the support portions 46, the number of which provided to the overlapping region 41a is different from the first embodiment. The support portions 46 are circumferentially arranged one after another around the communication port 431. Specifically, the back pad 41 has the six support portions 46a, 46b, 46c, 46d, 46e, 46f as the support portions 46 at the overlapping region 41a.

When the overlapping region 41a is equally divided by six into six areas B1-B6 in the circumferential direction about the center O of the communication port 431, the six support portions 46a, 46b, 46c, 46d, 46e, 46f are respectively located at the six areas B1-B6. The support portions 46a, 46b, 46c, 46d, 46e, 46f are arranged at a substantially equal angle interval θ (in this example, about 60°) in the circumferential direction around the center O of the communication port 431. Therefore, the vicinity portions, which are in the vicinity of the communication port 431 at the ventilation passage 44, extend radially outwardly and are arranged at the substantially equal angle interval in the circumferential direction around the center O of the communication port 431.

The rest of the configuration of the second embodiment is the same as that of the first embodiment. The seat air-conditioning device 10 of the present embodiment can achieve the advantages, which are achieved by the common configuration that is common to the first embodiment described above.

(1) In the present embodiment, the back pad 41 has the six support portions 45 that are respectively located at the six areas B1-B6 which are obtained by equally dividing the overlapping region 41a by six in the circumferential direction about the center O of the communication port 431. Therefore, the vicinity portions, which are in the vicinity of the communication port 431 at the ventilation passage 44, extend radially outwardly and are arranged at the substantially equal angle interval θ in the circumferential direction around the center O of the communication port 431. Therefore, when the airflow is supplied form the ventilation passage 44 to the communication port 431, it is possible to limit a variation in the flow rate of the airflow in the circumferential direction of the communication port 431. Thus, the airflow velocity distribution in the vicinity of the communication port 431 is made uniform.

Figure 16:
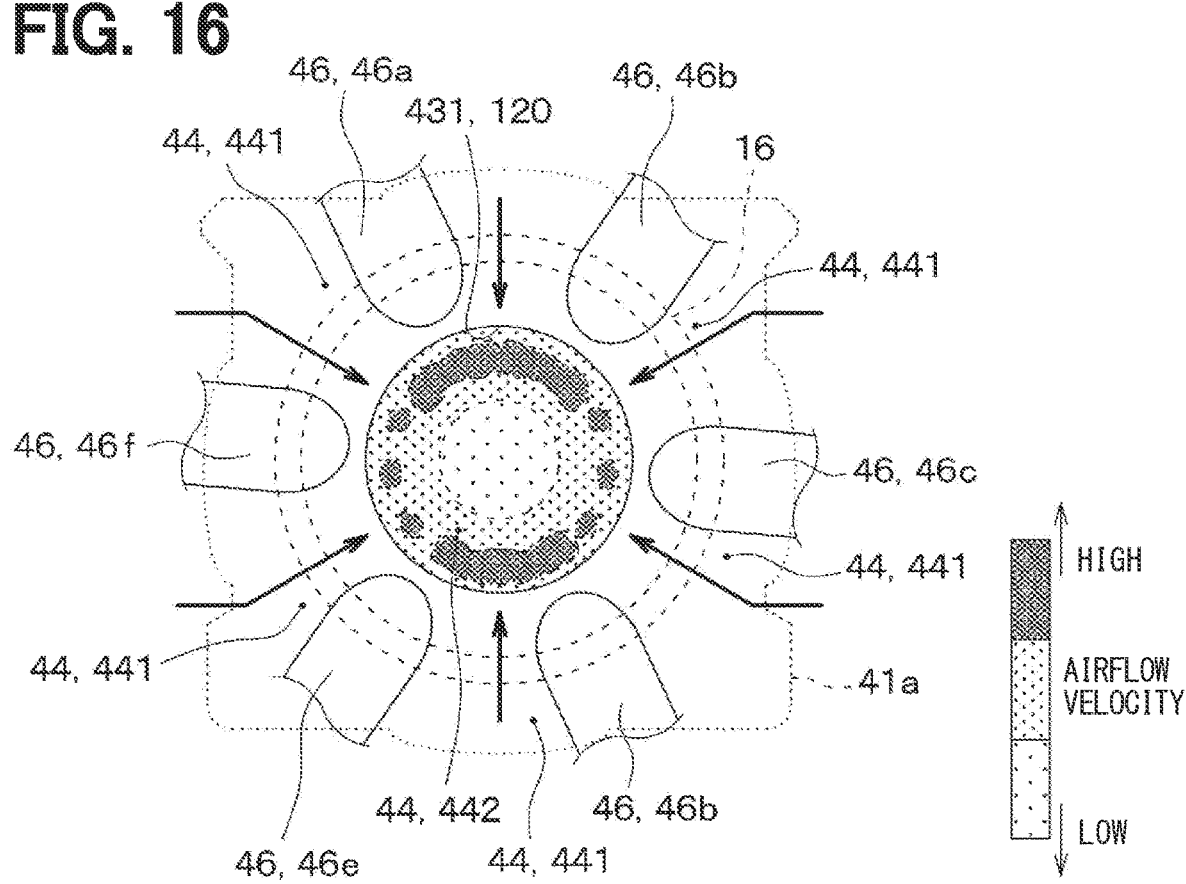
FIG. 16 is an explanatory diagram for explaining an airflow around a communication port of a back pad of the second embodiment.

Here, FIG. 16 is an explanatory diagram for explaining a measurement result of the airflow velocity distribution at the communication port 431 and the suction port 120. In FIG. 16, at the communication port 431 and the suction port 120, dots are arranged densely in each area where the airflow velocity is high, and the dots are arranged sparsely in an area where the airflow velocity is low. That is, FIG. 16 indicates that the airflow velocity in the area, in which the dots are arranged densely, is high, and the airflow velocity in the area, in which the dots are arranged sparsely, is low. As indicated in FIG. 16, it is understood that the airflow velocity is high throughout the entire circumferential extent of the communication port 431, and the airflow velocity distribution becomes uniform in the vicinity of the communication port 431.

Modifications of Second Embodiment

The back pad 41 of the second embodiment may be appropriately modified, for example, as follows.

First Modification

Figure 17:
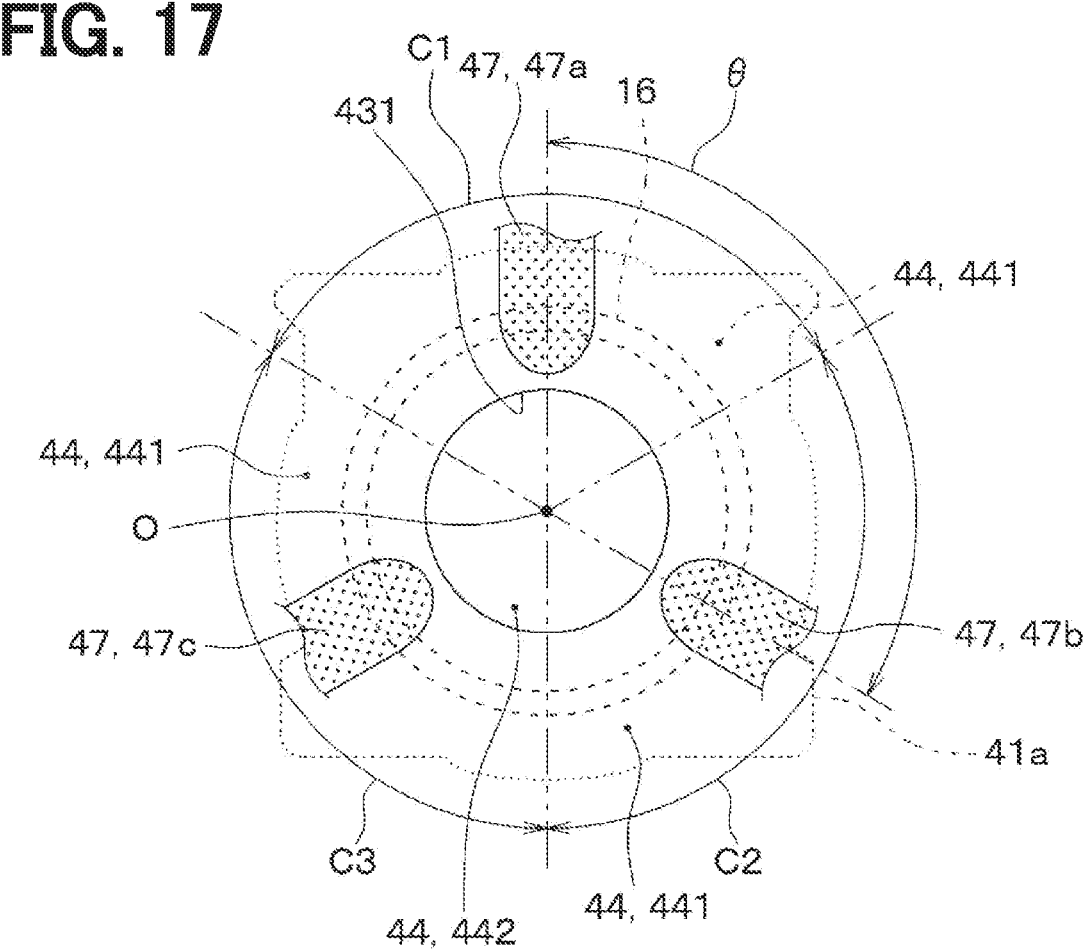
FIG. 17 is an explanatory diagram for explaining an arrangement pattern of the support portions around the communication port of the back pad according to a first modification of the second embodiment.

As shown in FIG. 17, the number of the support portions 47 arranged around the communication port 431 may be three. Specifically, the back pad 41 may have the three support portions 47a, 47b, 47c arranged at the overlapping region 41a. In this case, it is desirable that the overlapping region 41a is equally divided by three into three areas C1-C3 in the circumferential direction about the center O of the communication port 431, and the three support portions 47a, 47b, 47c are respectively located at the three areas C1-C3. The support portions 47a, 47b, 47c are arranged at a substantially equal angle interval θ (in this example, about 120°) in the circumferential direction around the center O of the communication port 431.

Second Modification

Figure 18:
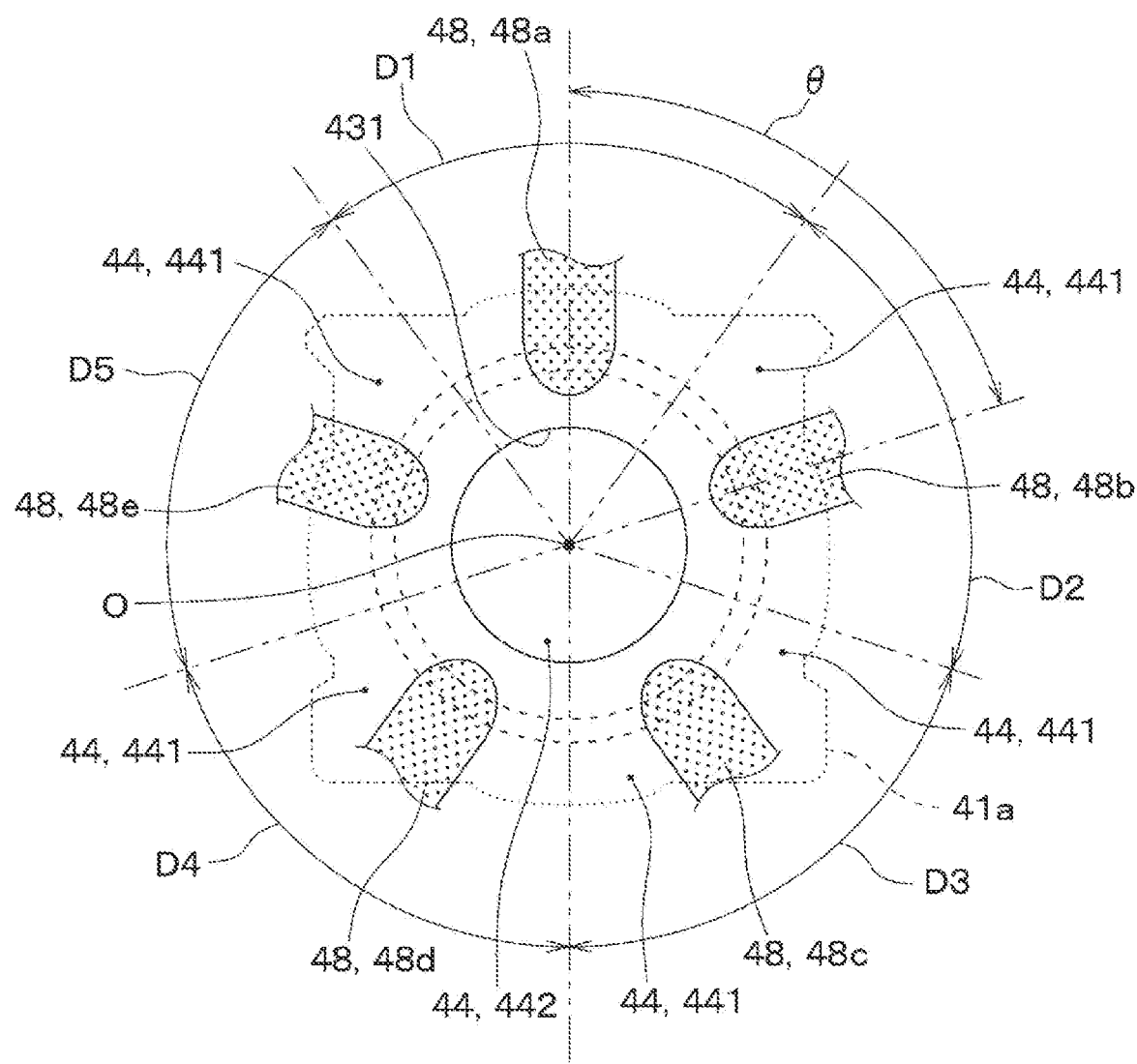
FIG. 18 is an explanatory diagram for explaining an arrangement pattern of the support portions around the communication port of the back pad according to a second modification of the second embodiment.

As shown in FIG. 18, the number of the support portions 48 arranged around the communication port 431 may be five. Specifically, the back pad 41 may have the five support portions 48a, 48b, 48c, 48d, 48e arranged at the overlapping region 41a. In this case, it is desirable that the overlapping region 41a is equally divided by five into five areas D1-D5 in the circumferential direction about the center O of the communication port 431, and the five support portions 48a, 48b, 48c, 48d, 48e are respectively located at the five areas D1-D5. The support portions 48a, 48b, 48c, 48d, 48e are arranged at a substantially equal angle interval θ (in this example, about 72°) in the circumferential direction around the center O of the communication port 431.

Other Modifications

From the viewpoint of ensuring the uniform airflow velocity distribution in the vicinity of the communication port 431, it is desirable that the back pad 41 has the at least three support portions 45, 46, 47, 48 at the overlapping region 41a. Furthermore, from the viewpoint of ensuring the sufficient cross-sectional area of the ventilation passage 44 in the vicinity of the communication port 431, it is desirable that the back pad 41 has six or less support portions 45, 46, 47, 48 at the overlapping region 41a.

Other Embodiments

Although the representative embodiments of the present disclosure have been described above, the present disclosure is not limited to the above-described embodiments and can be variously modified, for example, as follows.

In the embodiments described above, there is described the example, in which the back pad 41 has the seven ventilation holes 410. However, the present disclosure is not limited to this, and the back pad 41 may have the different number of the ventilation holes 410, which are different from the above described one. Furthermore, the shape of the ventilation groove 411 and the shape of the support portion 45 may be different from those described above.

Figure 19:
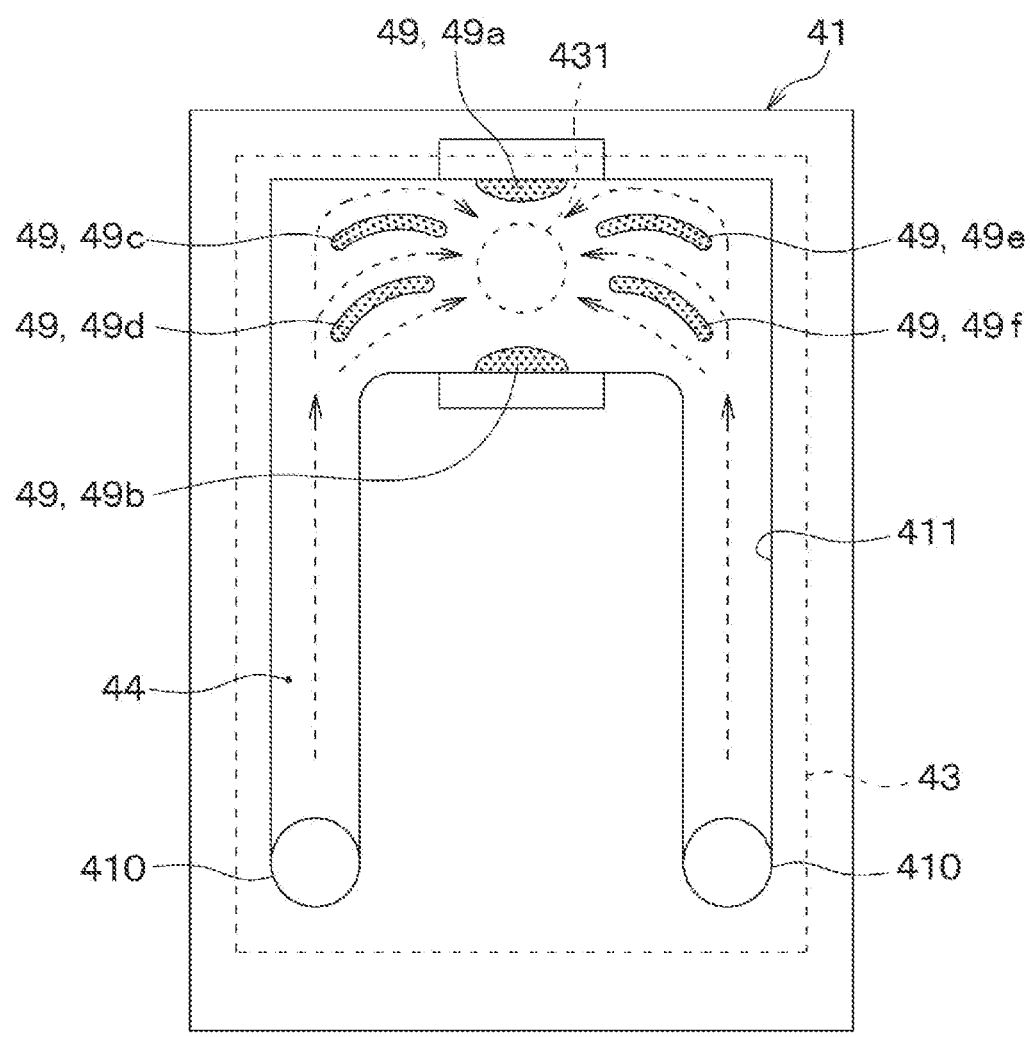
FIG. 19 is a schematic rear view of a back pad according another embodiment.
Figure 20:
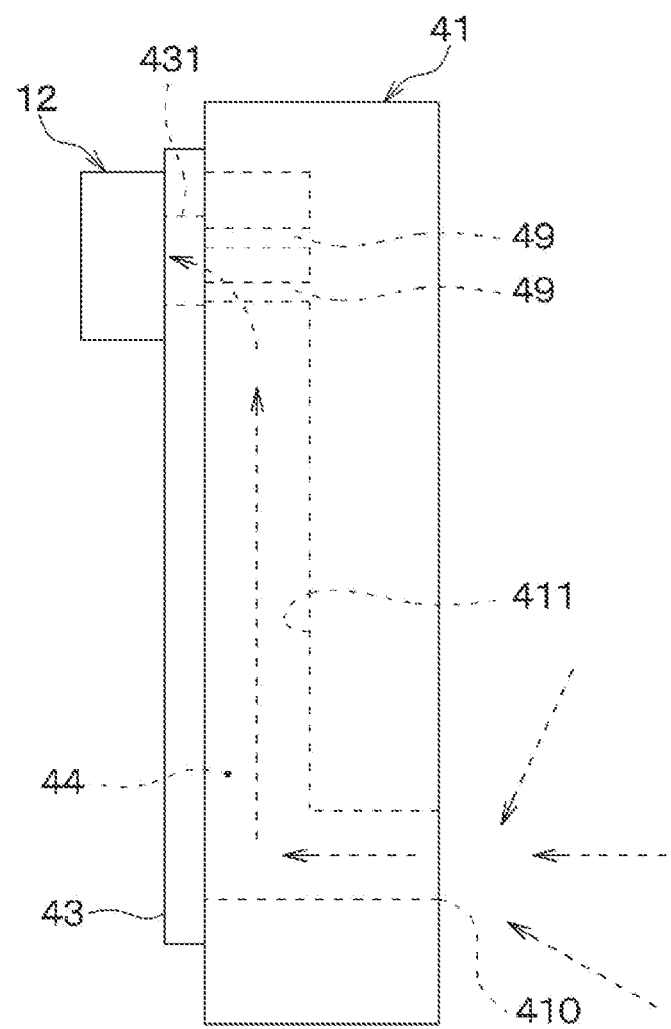
FIG. 20 is a lateral view of a seat back according the other embodiment.

For example, as shown in FIGS. 19 and 20, as long as the plurality of support portions 49 are provided around the communication port 431 at the back pad 41, the ventilation holes 410 may be placed only at one of the upper side, the lower side, the left side and the right side. As indicated in this example, it is desirable that the support portions 49 are arranged around the communication port 431 and extend radially. In addition to the support portions 49a, 49b, which are connected to the outside of the overlapping region 41a, the support portions 49 may include support portions 49c, 49d, 49e, 49f which are not connected to the outside of the overlapping region 41a and are dispersed at the ventilation passage 44. The same is true when the seat air-conditioning device 10 is applied to the seat cushion 2.

Figure 21:
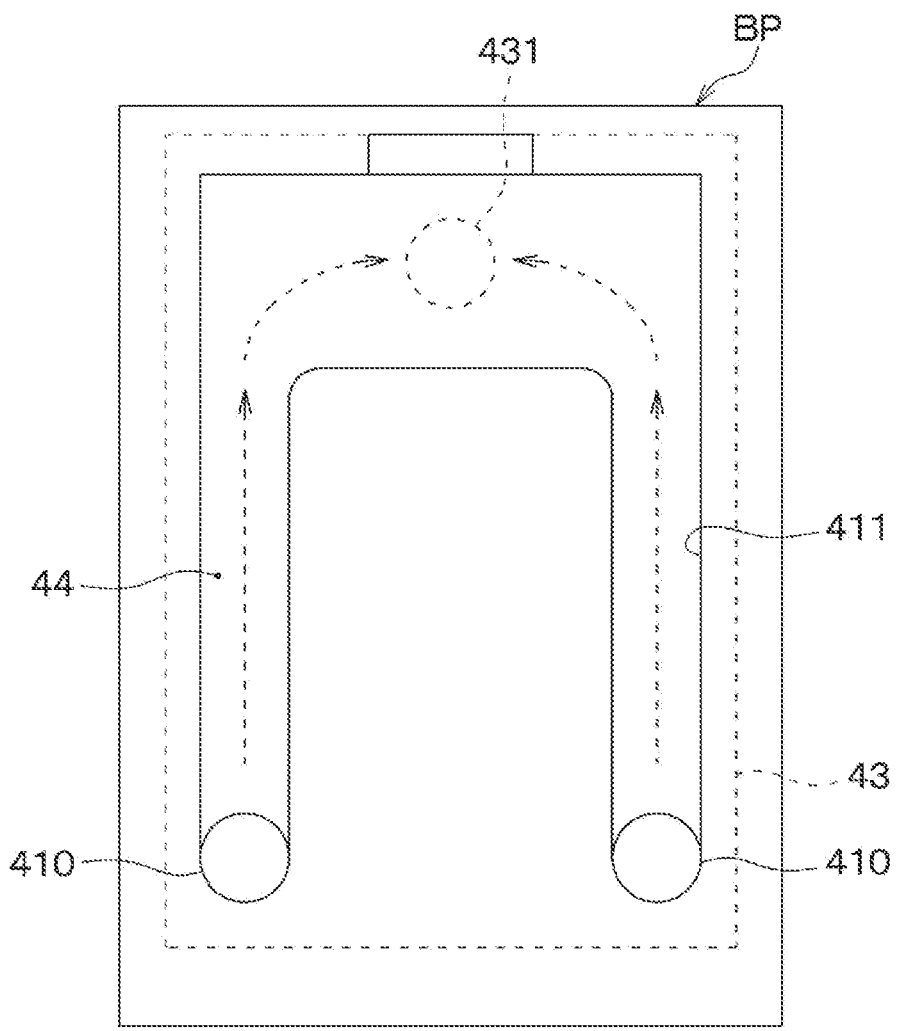
FIG. 21 is a schematic rear view a back pad of a comparative example.
Figure 22:
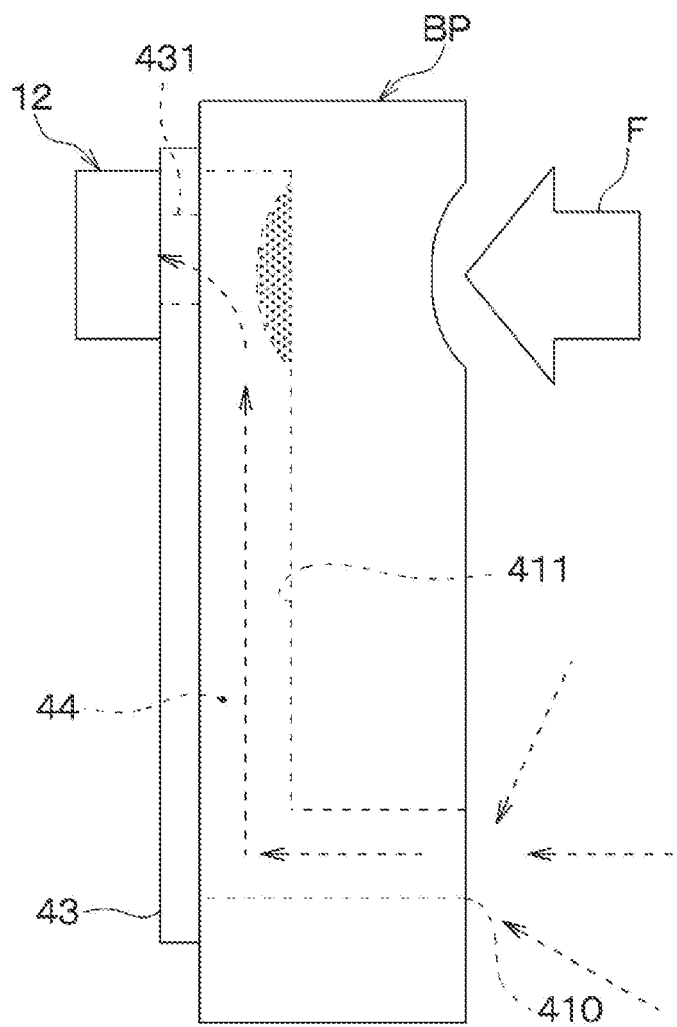
FIG. 22 is a schematic lateral view of a seat back of the comparative example.

Here, FIGS. 21 and 22 show a back pad BP of a comparative example of the embodiment shown in FIGS. 19 and 20. As shown in FIG. 21, the back pad BP of the comparative example differs from this embodiment with respect to that the support portions 49 are absent. In the back pad BP of the comparative example, as shown in FIG. 22, when the load F is applied to the front surface side of the overlapping region 41a, a part or the whole of the overlapping region 41a of the seat back SB is deformed to approach the back lid 43. Therefore, the distance between the back lid 43 and the bottom surface of the ventilation groove 411 is reduced.

In comparison to this, the back pad BP shown in FIGS. 19 and 20 has the support portions 49 which are provided at the overlapping region 41a and contact the back lid 43. Therefore, even when the load F is applied to the front surface side of the overlapping region 41a, the deformation of the overlapping region 41a of the seat back SB is limited. That is, it is possible to limit a reduction in the cross-sectional area of the ventilation passage 44 between the back pad 41 and the back lid 43 caused by the load resulting from, for example, the seating of the occupant.

In the embodiments described above, there are described the examples, in which the three to six support portions 45, 46, 47, 48, 49 are provided to the overlapping region 41a of the back pad 41. Alternatively, the back pad 41 may have any other number of the support portions 45, which is other than three to six.

In the embodiments described above, there is described the example, in which the support portions 45 are respectively located at the areas A1-A4 which are obtained by equally dividing the overlapping region 41a by the number of support portions 45 in the circumferential direction about the center O of the communication port 431. Alternatively, the support portions 45 may be arranged at a different arrangement pattern which is different from the above described one.

In the embodiments described above, there is described the example, in which each of the support portions 45 has the shape, the size of which is progressively reduced toward the communication port 431. However, the shape of the support portion 45 is not limited to this. For example, the size of the support portion 45 may not change toward the communication port 431 or may be increased toward the communication port 431. Furthermore, the shape of the support portion 45 is not limited to the one, in which the part of the support portion 45 adjacent to the communication port 431 is shaped in the round form that does not have the corner. Specifically, the shape of the support portion 45 may be set such that the part of the support portion 45, which is adjacent to the communication port 431, has the corner.

In the embodiments described above, there is described the example where each of the support portions 45 is placed in the overlapping region 41a at the location, at which the support portion 45 overlaps with the seal member 16 in the thickness direction of the back pad 41. However, the arrangement of the support portion 45 is not limited to this. The support portions 45 may be placed at a non-overlapping part of the overlapping region 41a which does not overlap with the seal member 16 in the thickness direction of the back pad 41.

In the embodiments described above, there is described the example, in which the blower 12 is the 360-degree blowing centrifugal blower. Alternatively, the blower 12 may be formed such that the casing 122 is a scroll casing. Furthermore, the impeller 121 of the blower 12 may be, for example, a sirocco fan or a radial fan in place of the turbofan. Furthermore, the blower 12 may be, for example, an axial flow blower or a cross flow fan in place of the centrifugal blower.

The seat air-conditioning device 10 of the embodiments described above includes the mounting plate 14 and the seal member 16. However, the mounting plate 14 and the seal member 16 are not essential elements of the seat air-conditioning device 10, and one or both of the mounting plate 14 and the seal member 16 may be eliminated.

The seat air-conditioning device 10 of the embodiments described above is configured to suction the air from the front surface of the seat back 4. However, the present disclosure is not limited to this. For example, the seat air-conditioning device 10 may be configured to discharge the air toward the front surface of the seat back 4.

The seat air-conditioning device 10 of the embodiments described above may be received at the seat cushion 2 instead of the seat back 4. Two seat air-conditioning devices 10 may be respectively received at the seat back 4 and the seat cushion 2. In the seat air-conditioning device 10, one or more components of, for example, the blower 12 may be placed at the outside of the seat 1.

In the embodiments described above, there is described the example where the seat air-conditioning device 10 of the present disclosure is applied to the seat 1 installed at the vehicle. However, the application of the seat air-conditioning device 10 is not limited to this. The seat air-conditioning device 10 may be widely applicable to, for example, a stationary seat used in a theater, a home or the like.

Needless to say, in the above-described embodiments, the elements of each embodiment are not necessarily essential except when it is clearly indicated that they are essential and when they are clearly considered to be essential in principle.

In each of the above embodiments, when a numerical value such as the number, numerical value, amount, range or the like of the constituent elements of the embodiment is mentioned, the present disclosure should not be limited to such a numerical value unless it is clearly stated that it is essential and/or it is required in principle.

In each of the above embodiments, when the shape, positional relationship or the like of the constituent elements of the embodiment is mentioned, the present disclosure should not be limited such a shape or positional relationship unless it is clearly stated that it is essential and/or it is required in principle.

What is claimed is:

1. A seat air-conditioning device applied to a seat, comprising:
   a seat pad that includes:
   a plurality of ventilation holes that are opened at a front surface of the seat pad which is configured to oppose an occupant seated on the seat; and
   a ventilation groove that is formed at a back surface of the seat pad which is opposite to the front surface, wherein the ventilation groove is communicated with the plurality of ventilation holes;
   a back lid that has one surface opposed to the back surface of the seat pad, wherein the back lid covers a whole extent of an opening side of the ventilation groove; and
   a blower that is opposed to another surface of the back lid, which is opposite to the one surface of the back lid, wherein the blower is configured to generate an airflow in a ventilation passage which is defined by the ventilation groove and the back lid, wherein:
   the back lid has a communication port that is formed at an opposing region of the back lid, which is opposed to the blower, wherein the communication port is configured to conduct the airflow generated by the blower;
   the seat pad has a plurality of support portions that contact the back lid and are located at an overlapping region of the seat pad which overlaps with the opposing region in a thickness direction of the seat pad;
   the plurality of support portions are circumferentially arranged one after another around the communication port;
   the blower is placed in contact with the back lid through a seal member which is placed to surround the communication port;
   the ventilation groove extends along the back lid, crosses the communication port, and extends radially outward beyond the communication port; and
   each of the plurality of support portions is formed integrally with the seat pad in one piece and is aligned with the seal member in an axial direction of a central axis of the communication port.

2. The seat air-conditioning device according to claim 1, wherein:
   a number of the plurality of support portions of the seat pad is at least three; and
   when the overlapping region is equally divided by the number of the plurality of support portions into a plurality of areas in a circumferential direction about a center of the communication port, the plurality of support portions are respectively located at the plurality of areas.

3. The seat air-conditioning device according to claim 2, wherein the blower is a 360-degree blowing centrifugal blower and is configured to radially outwardly blow air, which is suctioned from a suction port of the blower located at one side in an axial direction of a rotational axis of the blower, from an entire outer periphery of the blower around the rotational axis; and
   the communication port is formed at a portion of the back lid which is opposed to the suction port.

4. The seat air-conditioning device according to claim 1, wherein a size of each of the plurality of support portions is progressively decreased toward the communication port, and thereby a distance between each circumferentially adjacent two of the plurality of support portions is progressively increased toward the communication port.

5. The seat air-conditioning device according to claim 1, wherein a part of each of the plurality of support portions, which is adjacent to the communication port, is shaped in a round form that does not have a corner.

6. The seat air-conditioning device according to claim 1, wherein the plurality of support portions are placed at an overlapping part of the overlapping region which overlaps with the seal member in the thickness direction.

* * * * *